(12) United States Patent
Liu et al.

(10) Patent No.: US 10,628,222 B2
(45) Date of Patent: Apr. 21, 2020

(54) ALLOCATING COMPUTE OFFLOAD RESOURCES

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 15/157,183

(22) Filed: May 17, 2016

(65) Prior Publication Data

US 2017/0337091 A1 Nov. 23, 2017

(51) Int. Cl.
| | |
|---|---|
| *G06F 9/50* | (2006.01) |
| *G06Q 30/02* | (2012.01) |
| *H04W 4/21* | (2018.01) |
| *H04L 29/08* | (2006.01) |
| *H04W 4/60* | (2018.01) |

(52) U.S. Cl.
CPC .............. *G06F 9/5038* (2013.01); *G06F 9/50* (2013.01); *G06F 9/5061* (2013.01); *G06Q 30/0226* (2013.01); *H04L 67/12* (2013.01); *H04W 4/21* (2018.02); *H04W 4/60* (2018.02)

(58) Field of Classification Search
CPC . G06F 9/5038; G06F 9/5061; G06Q 30/0226; H04L 67/12; H04W 4/60; H04W 4/21
See application file for complete search history.

(56) References Cited

U.S. PATENT DOCUMENTS

| | | | |
|---|---|---|---|
| 8,381,120 B2 | 2/2013 | Stibel et al. | |
| 8,495,129 B2 | 7/2013 | Wolman et al. | |
| 8,706,798 B1 * | 4/2014 | Suchter | G06F 9/5038 709/202 |

(Continued)

FOREIGN PATENT DOCUMENTS

| | | |
|---|---|---|
| CN | 101132631 A * | 2/2008 |
| EP | 2602715 A1 | 12/2013 |

(Continued)

OTHER PUBLICATIONS

Translation of CN101132631-A with a publication date of Feb. 2008.*

(Continued)

*Primary Examiner* — Duy Khuong T Nguyen
*Assistant Examiner* — Kevin X Lu
(74) *Attorney, Agent, or Firm* — Patterson + Sheridan, LLP (57) ABSTRACT

Systems, methods, and computer program products to perform an operation comprising receiving, by a fog computing platform, a request from a wireless device to perform a compute task on behalf of the wireless device, determining a first computing resource, of a plurality of computing resources, required to perform the compute task, associating the request with a first level of priority, of a plurality of levels of priority, for accessing the first computing resource, allocating, based at least in part on the first level of priority, a portion of the first computing resource to perform the requested compute task.

20 Claims, 5 Drawing Sheets

(56) References Cited

U.S. PATENT DOCUMENTS

| | | | |
|---|---|---|---|
| 8,818,910 B1 | 8/2014 | Liu et al. | |
| 9,015,128 B2 | 4/2015 | Qin et al. | |
| 9,015,795 B2 | 4/2015 | B'Far et al. | |
| 9,025,756 B1* | 5/2015 | Graham | H04M 3/523 379/265.02 |
| 9,337,950 B2* | 5/2016 | Huo | H04J 14/0212 |
| 9,678,788 B2* | 6/2017 | Aslot | G06F 3/0619 |
| 2002/0174011 A1* | 11/2002 | Sanchez | G06Q 20/387 705/14.25 |
| 2006/0015588 A1* | 1/2006 | Achlioptas | G06Q 10/107 709/220 |
| 2007/0156530 A1* | 7/2007 | Schmitt | G06Q 30/02 705/14.17 |
| 2009/0070762 A1* | 3/2009 | Franaszek | G06F 9/4881 718/102 |
| 2009/0147682 A1 | 6/2009 | Salick | |
| 2009/0222864 A1* | 9/2009 | Drakoulis | G06Q 30/0603 725/87 |
| 2010/0119053 A1 | 5/2010 | Goeldi | |
| 2012/0278767 A1 | 11/2012 | Stibel et al. | |
| 2012/0290446 A1 | 11/2012 | England et al. | |
| 2012/0296974 A1 | 11/2012 | Tabe | |
| 2013/0018685 A1 | 1/2013 | Parnaby et al. | |
| 2013/0198363 A1* | 8/2013 | Kolluru | H04L 67/22 709/224 |
| 2013/0254407 A1* | 9/2013 | Pijewski | G06F 9/5083 709/226 |
| 2014/0095695 A1 | 4/2014 | Wang et al. | |
| 2014/0122355 A1 | 5/2014 | Hardtke et al. | |
| 2014/0129324 A1 | 5/2014 | Spivack et al. | |
| 2014/0136952 A1 | 5/2014 | Zhu et al. | |
| 2014/0236687 A1 | 8/2014 | Abel et al. | |
| 2014/0236858 A1 | 8/2014 | Abel et al. | |
| 2015/0006224 A1 | 1/2015 | Arditi et al. | |
| 2015/0319102 A1* | 11/2015 | Esdaile | H04L 47/803 709/225 |
| 2015/0347189 A1* | 12/2015 | Steffen | G06F 9/4893 718/103 |
| 2016/0055250 A1* | 2/2016 | Rush | G06Q 50/01 707/733 |
| 2016/0150085 A1* | 5/2016 | McCormack | H04M 3/5232 379/265.11 |
| 2016/0189197 A1* | 6/2016 | Kumar Goel | G06Q 30/0233 705/14.33 |
| 2016/0232468 A1* | 8/2016 | Meiri | G06Q 10/06315 |
| 2016/0292013 A1* | 10/2016 | Li | G06F 9/5066 |
| 2017/0171100 A1* | 6/2017 | Liu | H04L 47/70 |
| 2017/0199897 A1* | 7/2017 | Frederick | G06F 17/30241 |
| 2017/0279734 A1* | 9/2017 | Goncalves | H04L 47/781 |
| 2017/0324868 A1* | 11/2017 | Tamblyn | H04M 3/5191 |

FOREIGN PATENT DOCUMENTS

| | | |
|---|---|---|
| WO | 2013085569 A1 | 6/2013 |
| WO | 2015/135834 A1 | 9/2015 |

OTHER PUBLICATIONS

Hongbin Liang et Al., "Adaptive Computing Resource Allocation for Mobile Cloud Computing, International Journal of Distributed Sensor Networks", Dec. 2013, pp. 14, vol. 2013, Hindawi Publishing Corporation.
Sreeramaneni et al.; "CIMS: A Context-Based Intelligent Multimedia System for Ubiquitous Cloud Computing;" Open Access Information; ISSN 2078-2489; pp. 228-245.
IBM,"Micro-Cloud: Bringing the benefits of Cloud Computing to Data that Cannot Be Moved", Downloaded from <http://www-304.ibm.com/easyaccess/fileserve?contentid-255481>, on May 17, 2016, 3 pages.
Wersm,"Give Free Wifi in Exchange for facebook Check-In", Downloaded from <http://wersm.com/give-free-wifi-in-exchange-for-a-facebook-check-in/>, on May 17, 2016, 4 pages.
HotspotSystem,"HotSpot Free Social", Downloaded from <http://www.hotspotsystem.com/free-hotspot-social>, May 17, 2016, 4 pages.
Cisco,:You'll Like This! Cisco Meraki WIFI with Facebook Login, Downloaded from <https://meraki.cisco.com/blog/2013/05/youll-like-this-cisco-meraki-wifi-with-facebook-login> on May 17, 2016. 1 page.
MojoNetworks,"WeChat—This is How Social Wi-Fi is Done in China",Downloaded from <http://blog.mojonetworks.com/wechat-social-wi-fi-done-china/> on May 17, 2016. 1page.
Kemp et al., "Cuckoo: a Computation Offloading Framework for Smartphones". Mobile Computing, Applications, and Services, 2012, pp. 1-20.
Shi et al.,"Computing in Cirrus Clouds:The Challenge of Intermittent Connectivity", MCC '12 Proceedings of the first edition of the MCC workshop on Mobile cloud computing, 2012, pp. 23-28.
Cuervo et al.,"Maui:Making Smartphones Last Longer with Code Offload", ACM MobiSys 2010, 14 pages.
Chun et al.,"CloneCloud: Elastic Execution between Mobile Device and Cloud", EuroSys '11 Proceedings of the sixth conference on Computer systems, 2011, 14 pages.
Kosta et al.,"ThinkAir:Dynamic Resource allocation and parallel execution in cloud for mobile code offloading", INFOCOM, 2012 Proceedings IEEE, Mar. 2012, 9 pages.
Kao et al., "Hermes: Latency Optimal Task Assignment for Resource-constrained Mobile Computing", 2015 IEEE Conference on Computer Communications (INFOCOM), 2015, 9 pages.
Bonomi et al.,"Fog Computing and Its Role in the Internet of Things," Proceedings of the first edition of the MCC workshop on Mobile cloud computing, 2012, pp. 13-15.
Zhu et al.,"Improving Web Sites Performance Using Edge Servers in Fog Computing Architecture", Service Oriented System Engineering (SOSE), 2013 IEEE 7th International Symposium , pp. 320-323.
Hong et al., "Mobile fog: a programming model for large scale applications on the internet of things", Proceedings of the second ACM SIGCOMM workshop on Mobile cloud computing, 2013, pp. 15-20.
Gizmodo,"A New Wireless Router Lets You Trade Facebook CheckIns for Free Wifi", Downloaded from <http://gizmodo.com/a-new-wireless-router-lets-you-trade-facebook-check-ins-1583717498> on May 17, 2016. 2 pages.
Reynolds, Zack,"Klout:The Standard for Influence", Downloaded from <https://prezi.com/taeno7gsn0b4/klout-the-standard-for-influence/> on May 17, 2016. 3 pages.
Starwood Hotels & Resorts, "SPG Member Benefits", Downloaded from <http://www.starwoodhotels.com/preferredguest/about/index.html?categoryId=brand.benefits.platinum#InnerPage> on May 17, 2016. 2 pages.
Hyatt,"Hyatt Gold Membership Benefits", Downloaded from <http://www.hyatt.com/gp/en/benefits/membership_platinum.jsp> on May 17, 2016. 2 pages.
Abhilash Sreeramaneni et Al., CIMS: A Context-Based Intelligent Multimedia System for Ubiquitous Cloud Computing, Information, 2015, pp. 228-245, vol. 6, MDPI—Open Access Publishing.
Amazon Web Services,"AWS Free Tier", Downloaded from <https://aws.amazon.com/free/> on May 19, 2016. 11 pages.

* cited by examiner

ALLOCATING COMPUTE OFFLOAD RESOURCES

BACKGROUND

The present invention relates to compute offload allocation, and more specifically, to allocating compute offload resources.

Mobile devices and devices collectively referred to as the "Internet-of-Things" (IOT) devices number in the billions. Generally, mobile devices and IOT devices are characterized by limited computational resources and limited power supplies. To address these shortcomings, the computational tasks for these devices may be offloaded to cloud computing platforms or other devices having greater computational resources. Over time, devices having greater computational resources have moved toward the network edge to provide high-bandwidth, low-latency computational offload.

SUMMARY

According to one embodiment of the present invention, a method comprises receiving, by a fog computing platform, a request from a wireless device to perform a compute task on behalf of the wireless device, determining a first computing resource, of a plurality of computing resources, required to perform the compute task, associating the request with a first level of priority, of a plurality of levels of priority, for accessing the first computing resource, allocating, based at least in part on the first level of priority, a portion of the first computing resource to perform the requested compute task.

According to another embodiment, a system comprises a processor and a memory storing instructions which when executed by the processor, performs an operation comprising receiving, by a fog computing platform, a request from a wireless device to perform a compute task on behalf of the wireless device, determining a first computing resource, of a plurality of computing resources, required to perform the compute task, associating the request with a first level of priority, of a plurality of levels of priority, for accessing the first computing resource, allocating, based at least in part on the first level of priority, a portion of the first computing resource to perform the requested compute task.

According to another embodiment, a computer program product comprises a non-transitory computer-readable storage medium storing instructions which when executed by a processor performs an operation comprising receiving, by a fog computing platform, a request from a wireless device to perform a compute task on behalf of the wireless device, determining a first computing resource, of a plurality of computing resources, required to perform the compute task, associating the request with a first level of priority, of a plurality of levels of priority, for accessing the first computing resource, allocating, based at least in part on the first level of priority, a portion of the first computing resource to perform the requested compute task.

DETAILED DESCRIPTION

Embodiments disclosed herein provide access to differentiated levels of computational resources to users of wireless devices in fog computing environments. For example, a known, trusted user may receive priority access to a greater amount of computational resources relative to unknown users who may have to wait longer periods of time for lesser amounts of computing resources. Generally, users may be associated with a level of standing, which may be based on a score computed for the user. The score may be based on any number of factors, such as social media influence, the sentiment of the user's social media posts, the user's participation in a loyalty or rewards program, purchase history with a given retailer, characteristics of the user's device requesting compute resources, and the like.

When a user (or a wireless device associated with the user) generates a request to offload a computational task, embodiments disclosed herein may grant access to computational resources based on the user's score (and/or level of standing). For example, a user may connect to a wireless access point in a coffee shop. The user may then record a video of a local musician performing in the coffee shop with their smartphone. Due to storage constraints on the smartphone, the user may wish to store the video on a fog storage device provided by the coffee shop. When the user's mobile device requests to store the video on the storage device, the fog computing platform may allocate the necessary resources based on the customer's standing. For example, users with a higher standing level (or score) may be granted access to a large portion of storage on a fast storage device (e.g., a solid state drive) for an indefinite period of time, while users with a lower level of standing (or score) may be granted access to a smaller portion of storage on as lower storage device for a limited period of time.

As used herein, a "computational task," "computing task," or "compute task" refers to any computing operation that may be offloaded by a wireless device to a fog computing platform for completion. Example computational tasks include, without limitation, processing tasks, voice recognition, data storage, graphics processing tasks, augmented reality applications, image and video processing, cognitive applications, and access to dedicated, specialized hardware, such as field programmable gate arrays (FPGAs), coherent accelerators, encryption devices, and the like. As used herein, "the fog," or a "fog computing environment" refers to computing resources (physical or virtualized) that are offered for use by mobile devices, wireless devices, and Internet-of-Things (TOT) devices. The computing resources offered by the fog computing devices may be near a network edge, and are therefore near the devices connected to the network.

Figure 1:
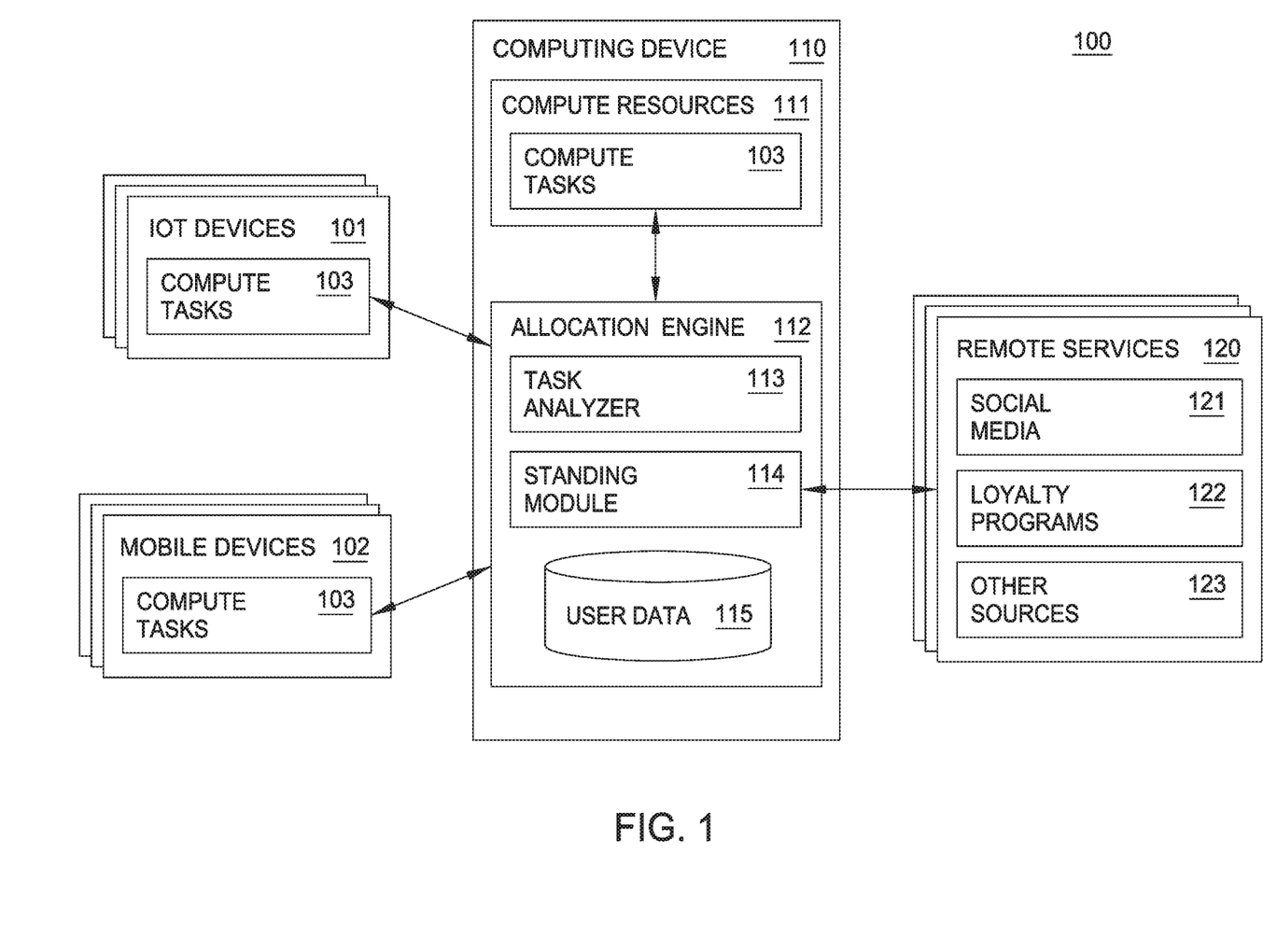
FIG. 1 illustrates a computing environment which allocates compute offload resources based on user standing, according to one embodiment.

FIG. 1 illustrates a computing environment 100 which allocates compute offload resources based on user standing, according to one embodiment. As shown, the computing environment 100 includes a plurality of Internet-of-Things (TOT) devices 101, mobile devices 102, at least one computing device 110, and remote services 120. Generally, the TOT devices 101, mobile devices 102, and computing device 110 may form part of a local area network, while the remote services 120 may be on the same local area network and/or a remote network. For example, the computing device 110 may be an edge router that provides wireless connectivity and compute offload resources to the TOT devices 101 and mobile devices 102. More generally, however, the computing device 110 is representative of any type of fog computing device. The TOT devices 101 are physical objects, such as devices, vehicles, buildings, and any other item that is embedded with electronics, software, sensors, and/or network connectivity that enables these objects to collect and exchange data via a network (not pictured). Examples of TOT devices 101 include smart watches, health trackers, fitness devices, portable video cameras, wearable devices, computer vision devices, and the like. The mobile devices 102 are generally representative of smart phones, tablet computers, portable gaming devices, and the like. The TOT devices 101 and mobile devices 102 may collectively be referred to as wireless devices herein. As shown, both the TOT devices 101 and mobile devices 102 include compute tasks 103. The compute tasks 103 are computing tasks that, due to the limitations of the TOT devices 101 and mobile devices 102, are sent to the computing device 110 for performance.

As shown, the computing device 110 includes compute resources 111 and an allocation engine 112. The compute resources 111 are representative of any type of computing resource, such as a processor, memory, storage, graphics processor, other dedicated hardware (such as a FPGA, coherent accelerator, encryption device, and the like), or virtualized resources. The allocation engine 112 is generally configured to grant access to the compute resources 111 to the compute tasks 103 of the TOT devices 101 and mobile devices 102 based on an analysis of each user associated with the TOT devices 101 and/or mobile devices 102. As shown, the allocation engine 112 includes a task analyzer 113, a standing module 114, and a user data store 115. The task analyzer 113 is configured to analyze the compute tasks 103 received from the TOT devices 101 and mobile devices 102 in light of the available compute resources 111 in the computing device 110. Generally, the task analyzer 113 may analyze the compute task 103 to determine the type of the task (e.g., data storage, data processing, and the like), as well as the type, amount, and duration of compute resources 111 required to process the task 103. The task analyzer 113 may also determine a monetary cost of processing the task 103. In at least one embodiment, the cost of processing the compute task 103 may be based on the customer's standing. The task analyzer 113 may also determine a current level of use of the compute resources 111 as well as a forecasted use of the compute resources 111 based on currently running tasks 103 (and requests received to offload tasks 103). Generally, the allocation engine 112 may use the outputs generated by the task analyzer 113 when determining whether to allocate compute resources 111 to serve the compute tasks 103 sent to the computing device 110 by the TOT devices 101 and mobile devices 102.

The standing module 114 is configured to determine and maintain levels of standing of a plurality of different users associated with the TOT devices 101 and/or the mobile devices 102. Generally, the standing module 114 may analyze different data sources to compute a standing score for each user. The score may correspond to one of a plurality of different levels of standing. For example, if the standing score is on a scale from 0-100, a "priority" level of standing may be associated with a standing score of 90-100, while a "valued user" level of standing may be associated with a standing score of 70-89, and a "default" level of standing may be associated with a standing score of 40-60. Generally, any number of levels of standing may be defined. The allocation engine 112 may use these standing scores and standing levels when determining whether to allocate compute resources 111 for offload compute tasks 103. For example, the allocation engine 112 may allocate more resources for a longer period of time to a user with a priority score of 95 (and in the "priority" level) before allocating fewer resources to a shorter period of time to another user with a priority score of 81 (and a "valued user" level of standing). The standing levels may generally correspond to a quality of service (QoS) provided to users requesting to offload compute tasks in the fog computing environment. The standing module 114 may periodically recompute the standing scores for each user and update the user data 115 accordingly.

The standing module 114 may leverage the remote services 120 when determining the standing of a given user. As shown, the remote services 120 include social media 121, loyalty programs 122, and other data sources 123. Social media 121 is representative of services that allow users to publicly share information. Examples of social media services include Facebook®, Twitter®, and LinkedIn®. The standing module 114 may analyze the amount and type of content shared by users on the social media 121. For example, the standing module 114 may compute a higher standing score for users that frequently post restaurant reviews on social media 121. The standing module 114 may also analyze the sentiment of content shared by users on social media 121. For example, by analyzing the textual reviews shared on social media 121, the standing module 114 may determine that a user is generally happy with a product, brand, or retailer, and assign a higher standing score for the user. The standing module 114 may also analyze images, videos, and other content shared on social media 121 for sentiment. For example, the standing module 114 may detect a group of smiling faces in a photo taken at a birthday party held at a restaurant and identify positive sentiment for the photo (and the restaurant, by association). Similarly, if the standing module 114 determines an upset or unhappy sentiment in the textual reviews, the standing module 114 may assign a higher standing score for the user, as access to the offload compute resources 111 may please the user.

The loyalty programs 122 are programs used encourage customers to continue to shop at or use the services of businesses associated with each program. If a user is a member of a loyalty program 122, the standing module 114 may assign a higher standing score to the user. Similarly, if the loyalty program 122 reflects frequent purchases or other activity for the user, the standing module 114 may further increase the standing score to the user. The other services 123 are representative of other data sources that the standing module 114 can leverage to determine the standing of users. For example, the other services 123 may include a Klout® score which represents the online influence or standing of users. If the standing module 114 determines that a user has a high Klout® score, the standing module 114 may assign the user a higher standing score. The other sources 123 may further include business or personal webpages, blogs, purchase history, informational data services, facial recognition services (to identify the face of the user), and emotional detection services (to detect emotions of the user), and the like.

The user data 115 stores, for each of a plurality of users, a respective set of standing scores, associated levels of standing, and any other user attribute (such as address, birthplace, and the like). The customer standing scores for a given user may be specific to a given source, such as a business or other organization. In at least one embodiment, a user may be associated with an overall standing score which is the result of a weighted sum of each individual standing score. The user data 115 may also include a history of prior requests to offload compute tasks 103 and the resources allocated (or denied) responsive to the request. The user data 115 may also reflect associations between users and IOT devices 101 and/or mobile devices 102. The user data 115 may specify metadata regarding each TOT device 101 and/or mobile device 102, such as make and model of the device, processor speed, amount of RAM, amount of storage space available, battery life, round trip time to the network edge, packet loss rate, packet throughput rate, network connection type, and the like.

As previously indicated, the IOT devices 101 and the mobile devices 102 may connect to a local area network (LAN) provided by the fog computing environment 100. Once a user is authenticated in the fog 100, the allocation engine 112 may transmit an indication of the capabilities and services provided by the fog 100 via the compute resources 111. For example, the allocation engine 112 may specify that the compute resources 111 provide image/video storage, contact upload, and task processing, such that the devices 101, 102 may be aware of the services offered in the fog 100. Generally, responsive to receiving a request to offload a compute task 103 from the IOT devices 101 and/or the mobile devices 102, the allocation engine 112 may determine a user account in the user data 115 associated with the request. The allocation engine 112 may invoke the task analyzer 113 to determine the type of task, the type, quantity, and duration of compute resources 111 required to perform the task, and a cost of allocating the resources. The standing module 114 may compute a standing score for the user in the event the user is not associated with a standing score in the user data 115. The allocation engine 112 may then determine whether to allocate resources 111 for the compute task 103 based on the user's standing, the standing of other users requesting to offload other compute tasks 103, the current use of compute resources 111, the forecasted use of compute resources 111, and the analysis of the task analyzer 113 and standing module 114.

For example, user A may have a wearable fitness device which wishes to upload the user's heart rate and step count to the user's fitness profile, while user B's smartphone may wish to upload a lengthy video for permanent storage in the computing device 110. In response, the allocation engine 112 may determine that user A's task is not computationally complex, requires few computing resources, and does not require the resources for an extended period of time. Similarly, the allocation engine 112 may determine that user B's task requires the extended use of a significant amount of storage resources. Based on these attributes alone, the allocation engine 112 may allocate resources 111 to user A prior to allocating resources 111 to user B. However, the allocation engine 112 may further consider the user data 115 associated with users A and B before allocating or not allocating resources to these users. For example, if user B has the highest possible standing score, the allocation engine 112 may immediately allocate the storage resources to store user B's video. Furthermore, if user A has a lower standing score than user B, the allocation engine 112 may allocate resources 111 to user A only after user B's task completes.

As another example, if user A and user B have roughly equal standing scores, the allocation engine 112 may concurrently allocate resources to each user (assuming the resources 111 are available).

Figure 2:
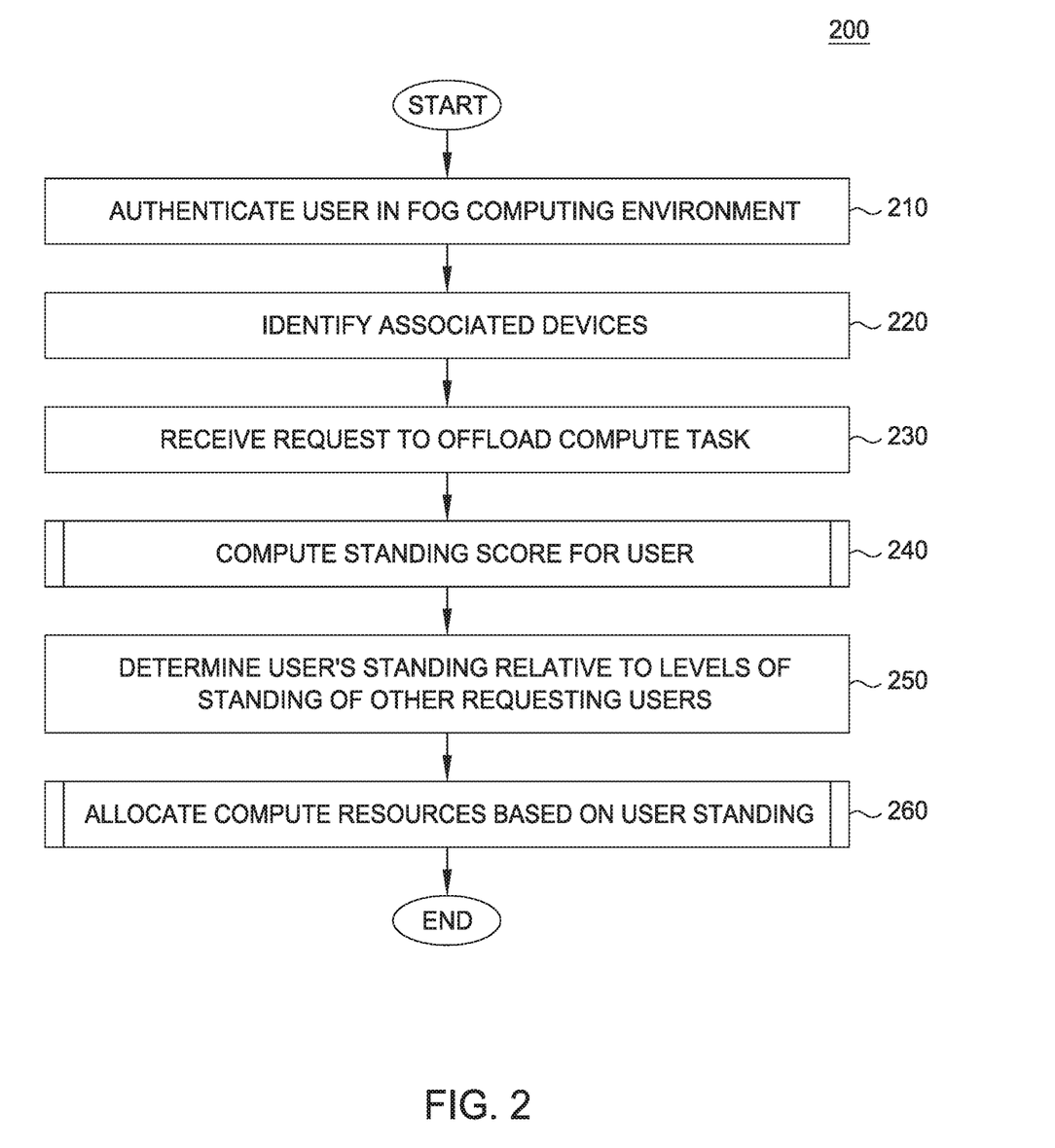
FIG. 2 is a flow chart illustrating a method to allocate compute offload resources based on user standing, according to one embodiment.

FIG. 2 is a flow chart illustrating a method 200 to allocate compute offload resources based on user standing, according to one embodiment. As shown, the method 200 begins at block 210, where a user is authenticated in a fog computing environment 100. For example, at block 210, the user may connect to a wireless access point provided by a retailer, restaurant, or other establishment. The user may then authenticate (e.g., supply a login/password or an email address) to obtain Internet access as well as access to offload compute resources 111 provided in the fog 100. As another example, the allocation engine 112 may authenticate the user by identifying the media access control (MAC) address of the IOT device 101 or mobile device 102 connecting to the fog computing environment. At block 220, the allocation engine 112 may identify any devices associated with the user. For example, if the user authenticates with a login/password on their smartphone, the allocation engine 112 may identify other wearable devices associated with the user in the user data 115. At block 230, the allocation engine 112 may receive a request to offload a compute task from one or more of the TOT devices 101 and/or the mobile devices 102 associated with the user. At block 240, described in greater detail with reference to FIG. 3, the allocation engine 112 may invoke the standing module 114 to compute a standing score for the user. At block 250, the allocation engine 112 may determine the user's standing relative to the levels of standing (and/or standing scores) of other users requesting to offload compute tasks. At block 260, described in greater detail with reference to FIG. 4, the allocation engine 112 may allocate compute resources based on customer standing. Doing so may provide quality of service (QoS) to offloaded compute tasks in the fog computing environment based at least in part on the user's standing.

Figure 3:
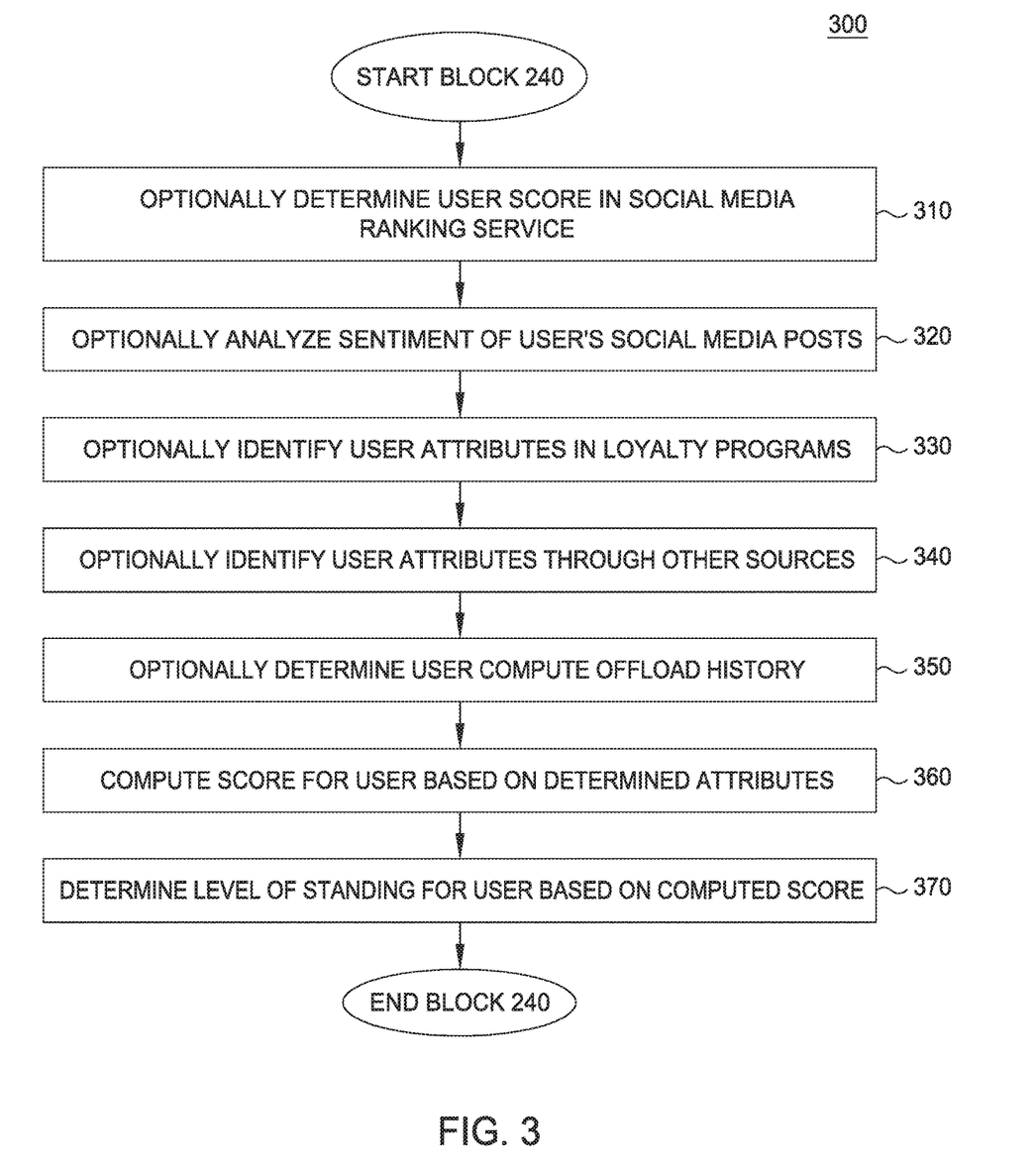
FIG. 3 is a flow chart illustrating a method to compute a score reflecting a user's standing, according to one embodiment.

FIG. 3 is a flow chart illustrating a method 300 corresponding to block 240 to compute a score reflecting a user's standing, according to one embodiment. The standing module 114 may perform the method 300 to determine and periodically refine the standing score and level of standing for each of a plurality of users. As shown, the method 300 begins at block 310, where the standing module 114 optionally determine the current user's score in a social media ranking service, such as Klout®. The score may reflect the level of impact or influence the user generally has via their social media presence. At block 320, the standing module 114 may optionally analyze the sentiment of the user's social media posts. Generally, to analyze social media sentiment, the standing module 114 may perform text analytics on the text of publications created by the user, analyze image data of images and/or videos posted by the user, and the like. At block 330, the standing module 114 may optionally identify user attributes related to loyalty programs the user is enrolled in. For example, a user's profile in the loyalty program may reflect that a user frequently visits a specific location of a retailer's store, frequently makes purchases on the retailer's website, and has been a member in the loyalty program for 10 years.

At block 340, the standing module 114 may optionally identify other user attributes from the other sources 123. For example, a facial recognition service may identify the user, and an emotion detection service may determine the user's current set of emotions, or the user's current mood. As such, these services may be used to determine an estimate of the user's current level of happiness, which may assist the standing module 114 determine the user's current standing. At block 350, the standing module 114 may optionally determine the user's compute offload history. For example, the user data 115 may reflect prior instances in which the user has received access to the compute resources 111 for offload compute tasks. At block 360, the standing module 114 may compute a standing score for the user based on one or more of the results of blocks 310-350. As previously indicated, the standing score may be specific to a given entity. However, the standing score may also be an aggregate standing score for the user which considers each entity-specific standing score for the user. At block 370, the standing module 114 may determine the user's level of standing based on the score computed at block 360. For example, a user's standing score may be 88 on a scale of 0-100. The user may then be associated with the standing level corresponding to the standing score (e.g., standing scores in the range of 80-89 may belong to one standing level, of ten different standing levels each defined by a ten point range). The standing module 114 may then store the determined standing scores and standing levels in the user data 115.

Figure 4:
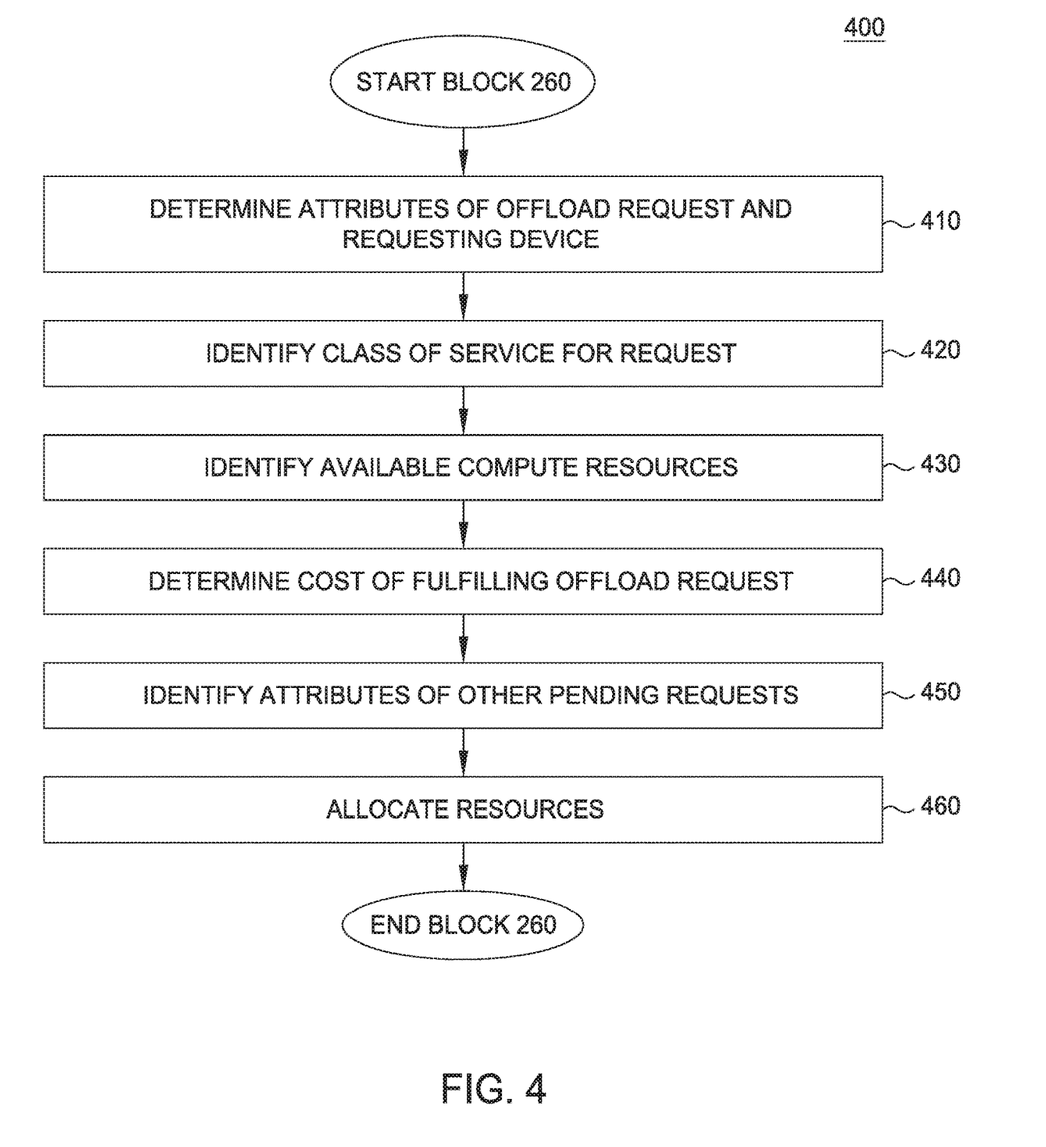
FIG. 4 is a flow chart illustrating a method to allocate compute resources based on user standing, according to one embodiment.

FIG. 4 is a flow chart illustrating a method 400 corresponding to block 260 to allocate compute resources based on user standing, according to one embodiment. As shown, the method begins at block 410, where the allocation engine 112 determines the attributes of the requested compute task. Generally, the allocation engine 112 may invoke the task analyzer 113 to analyze the computing task requested for offloading to the fog computing platform. As previously indicated, the task analyzer 113 may consider the resource requirements to fulfill the request, such as CPU, latency, storage, RAM, and the like. Similarly, the allocation engine 112 may consider the attributes of the requesting TOT device 101 or mobile device 102, such as make/model, hardware specifications, typical computing tasks, speed of the network connection between the device and the fog computing platform, and the like. At block 420, the allocation engine 112 may identify a class of service for the requested computing task. The class of service may correspond to the requesting user's level of standing (which in turn may be determined based on the standing score computed for the user), which may be one of a plurality of levels of standing that may be associated with users.

At block 430, the allocation engine 112 may identify the currently available compute resources 111 in the fog computing environment 100. Generally, the allocation engine 112 may maintain statistics describing the current (and forecasted) resource utilization levels of the compute resources 111. The allocation engine 112 may consider these use levels when determining whether to allocate resources responsive to a request to offload a compute task. At block 440, the allocation engine 112 may determine the cost of fulfilling the request to offload the compute task. The cost may be in terms of currency and/or resource requirements. For example, the task analyzer 113 may determine that the computing task requires a specific number of CPU cycles, a certain amount of RAM, and a minimum latency value. The cost may further be based on the user's level of standing (or standing score). For example, the monetary cost of providing the service to a repeat customer may be reduced by the value received in valuing or promoting an existing relationship with the repeat customer. However, for an unknown user, or a user who seldom makes purchases from an entity, the value for promoting the relationship via the offered compute services may not be realized, and the monetary cost remains unchanged (or is increased).

At block 450, the allocation engine 112 may determine the attributes of other pending requests to offload compute tasks. For example, the allocation engine 112 may identify that the requesting user has requested to offload multiple compute tasks, which may negatively impact the fulfillment of any single request (e.g., to ensure that one user does not tie up all resources at a given time). Similarly, other users may request to offload compute tasks. As such, the allocation engine 112 may determine the attributes of these requested tasks, as well as the standing score of each requesting user. In some embodiments, the allocation engine 112 may assign a task a certain priority within the fog computing framework based each user's level of standing. The priority of a task may be associated with how much time the task has access to compute resources in the fog computing environment in comparison to other tasks. In at least one embodiment, higher priority tasks may receive more time than lower priority tasks. Doing so allows the allocation engine 112 to assign resources while considering currently allocated resources, currently requested resources, and the current set of devices using the offload system.

When considering pending requests from different users, the allocation engine 112 may generally prioritize each request based on the standing of each user. For example, a first user may have a standing score of 67, a second user may have a standing score of 51, and a third user may have a standing score of 23. In such an example, the allocation engine 112 may assign the first user a highest level of priority, while assigning the second user the second highest level of priority, and assign the third user the third highest level of priority, of a plurality of levels of priority. In some embodiments, the allocation engine 112 may normalize the standing scores of each user. For example, the allocation engine 112 may normalize the first user's score to 100, normalize the second user's score to 51/67=76, and normalize the third user's score could to 23/67=34.

At block 460, the allocation engine 112 may allocate resources based at least in part on the user's standing level. Generally, the allocation engine 112 may allocate resources based on a predefined association between a level of standing and a set of compute resources 111. More generally, the allocation engine 112 may allocate resources in any feasible manner. For example, in one embodiment, the allocation engine 112 may allocate resources on a per-task basis, such that each task is processed until completion. In another embodiment, the allocation engine 112 may allocate resources on a resource-specific allocation basis (e.g., CPU clock cycles, gigabytes of memory, gigabytes of storage space, and the like). For example, the allocation engine 112 may allocate a specified number of CPU clock cycles to a task. However, the task may not complete in using these specified number of CPU cycles. Therefore, the allocation engine 112 would subsequently reconsider the remaining portion of the task as described herein, and allocate additional CPU cycles until the task is completed.

As previously indicated, the compute resources 111 are various and shared by multiple users. The allocation engine 112 may be considered a shared resource manager (SRM) for each compute resource 111. The allocation engine 112 may therefore implement priority levels, and access to each resource in a variety of ways. In one embodiment, the allocation engine 112 may provide quality of service (QoS) based priority levels, where each resource provides a plurality of different QoS priority levels. The allocation engine 112 may map a user's standing score to one of the QoS priority queues directly. For example, users with standing scores in the 90-100 range may be mapped to the highest QoS priority class, users with scores in the 80-90 range may be mapped to the second highest QoS priority class, and so on. In such an example, the allocation engine 112 may divide 100 by the number of QoS classes for a given resource, and assign users to these QoS priority classes based on their standing scores.

Alternatively or additionally, the allocation engine 112 may allocate resources on a time-based scale. For example the allocation engine 112 may allocate a task a minimum of 25 ms of CPU time over the next 200 ms. However, for competing tasks, the allocation engine 112 may assign CPU time to each task based on the respective standing score of each user. For example, the allocation engine 112 may sum the standing scores of each user, and assign time to each user based on their weight. Continuing with the previous example, the sum of all standing scores may be 67+51+23=141. The allocation engine 112 may then provide a weight of 67/141=0.47 to the first user, a weight of 51/141=0.36, and a weight of 23/141=0.16 to the third user, based on each user's standing score. Based on these weights, the allocation engine 112 may grant access to a given resource (or multiple resources) to the first user 47% of the time, while granting the second access 36% of the time, and granting access to the third user 16% of the time. The allocation engine 112 may use other divisions based on a weightage, such as allocating CPU cores to a customer, or allocating CPU clock cycles.

As previously indicated, the allocation engine 112 may periodically re-compute standing scores over time. Doing so allows the allocation engine 112 to allocate resources based on the most current standing of each user.

Figure 5:
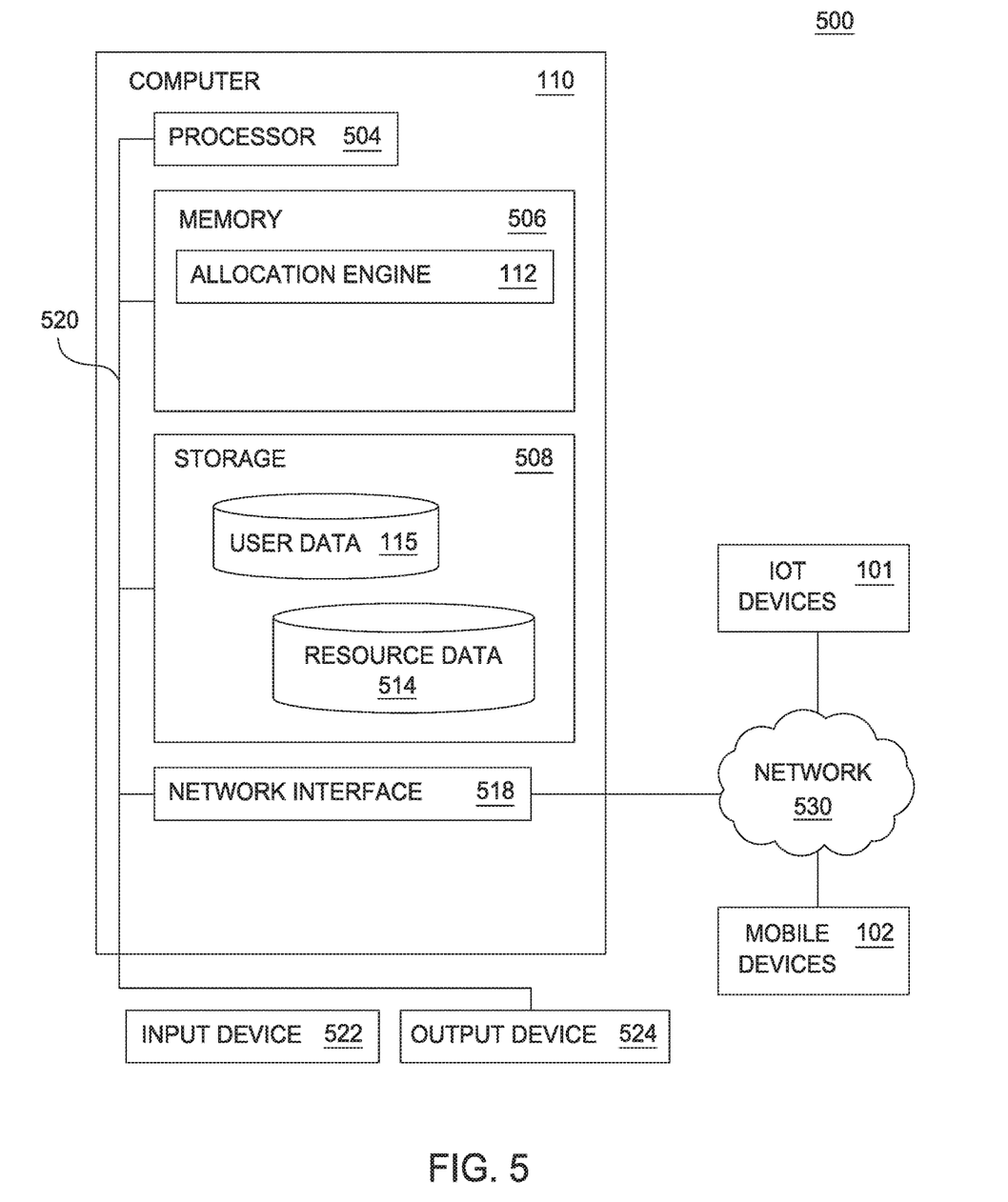
FIG. 5 is a block diagram illustrating a system which allocates compute offload resources based on user standing, according to one embodiment.

FIG. 5 is a block diagram illustrating a system 500 which allocates compute offload resources based on user standing, according to one embodiment. The networked system 500 includes the computer 110. The computer 110 may also be connected to other computers, the TOT devices 101, and the mobile devices 102 via a network 530. In general, the network 530 may be a telecommunications network and/or a wide area network (WAN). In a particular embodiment, the network 530 is the Internet. In another embodiment, the network 530 is a local area network (LAN) that supports the offloading of compute tasks in a fog computing environment.

The computer 110 generally includes a processor 504 which obtains instructions and data via a bus 520 from a memory 506 and/or a storage 508. The computer 110 may also include one or more network interface devices 518, input devices 522, and output devices 524 connected to the bus 520. The computer 110 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 110 to communicate with other computers via the network 530.

The storage 508 is representative of hard-disk drives, solid state drives, flash memory devices, optical media and the like. Generally, the storage 508 stores application programs and data for use by the computer 110. In addition, the memory 506 and the storage 508 may be considered to include memory physically located elsewhere; for example, on another computer coupled to the computer 110 via the bus 520.

The input device 522 may be any device for providing input to the computer 110. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 110. The output device 524 may include output devices such as monitors, touch screen displays, and so on.

The computer 110 is generally configured to implement all apparatuses, methods, and functionality described herein. As shown, the memory 506 contains the allocation engine 112, which is configured to allocate resources in a compute offload environment. As shown, the storage 508 contains the user data 115 and the resource data 514. The resource data 514 is configured to store data reflecting use rates of the computing resources offered by the computer 110. For example, the resource data 514 may reflect that 70% of the memory 506 and 80% of the CPU 504 is currently in use. The resource data 514 may also store predefined associations between resource allocations, task types, and user standing levels. For example, a first association may allocate 1 gigabyte of storage space for storage tasks issued by high-priority users, while a second association may allocate 100 megabytes of storage space for storage tasks issued by default priority users. Doing so allows the allocation engine 112 to provide a differentiated resource allocation scheme amongst a variety of different users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the allocation engine 112 could execute on a computing system in the cloud and allocate computing resources to compute offload tasks. In such a case, the allocation engine 112 could monitor resource use and store the data describing the current resource use at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

The claims are as follows:

1. A method, comprising:
   receiving, by a fog computing platform, a request from a wireless device to perform a compute task on behalf of the wireless device;
   determining a first computing resource, of a plurality of computing resources, required to perform the compute task;
   determining a sentiment of a text of a first item of content, of a plurality of items of content, published by a user associated with the wireless device on one of a plurality of social media platforms;
   determining a level of participation of the user in a loyalty program, wherein the level of participation includes purchase history of the user;
   determining a history of requests issued by a plurality of wireless devices associated with the user, wherein the requests comprise requests for the fog computing environment to perform compute tasks on behalf of one or more of the plurality of wireless devices associated with the user;
   computing a score for the user based at least in part on the determined sentiment of the text, the determined level of participation in the loyalty program;
   associating, based on the score and the history of requests, the request with a first level of priority, of a plurality of levels of priority, for accessing the first computing resource;
   allocating, based at least in part on the first level of priority and a first resource requirement to complete the requested compute task, a first portion of the first computing resource to perform the requested compute task, wherein the first portion is insufficient to complete the requested compute task;
   associating, based on the score and the history of requests, the request with an updated level of priority of the plurality of levels of priority; and
   subsequently to allocating the first portion, allocating, based at least in part on the updated level of priority and a second resource requirement to complete a remainder of the requested compute task, a second portion of the first computing resource to perform the remainder of the requested compute task.

2. The method of claim 1, wherein the score is further computed based on:
   a sentiment expressed by the user in a second item of content of the plurality of items of content published by the user on the plurality of social media platforms, wherein the second item of content comprises an image depicting the user; and
   a length of time the user has been a member of the loyalty program.

3. The method of claim 2, wherein the computed score is associated with the first level of priority, wherein the computed score is relative to a first business that provides the allocated portion of the first computing resource, wherein the user is associated with a plurality of scores, wherein each of the plurality of scores is associated with a respective business that provides respective computing resources, wherein the user is further associated with a composite score, wherein the composite score is based on each of the plurality of scores.

4. The method of claim 1, further comprising prior to allocating the portion of the first computing resource:
   determining a set of attributes of the wireless device;
   identifying a set of computing resources required to perform the compute task, wherein the set of computing resources is of the plurality of computing resources and includes the first computing resource;
   determining an amount of time required to perform the compute task using the set of compute resources;
   determining a cost of performing the compute task using the set of compute resources;
   determining a level of use of all compute resources in the fog computing environment;
   determining a set of currently pending compute tasks to be performed by the fog computing environment, and
   allocating the set of computing resources to the wireless device based on the set of attributes of the wireless device, the set amount of time required to perform of the compute task, the cost of performing the compute task, the level of use of the compute resources in the fog computing environment, and the set of currently pending compute tasks.

5. The method of claim 1, wherein the wireless device comprises an Internet-of-Things (IOT) device, wherein the plurality of computing resources comprise: (i) a processor, (ii) a storage device, (iii) a memory, (iv) a graphics processor, (v) a field programmable gate array (FPGA), (vi) a coherent accelerator, and (vii) an encryption device.

6. The method of claim 1, wherein allocating the portion of the first computing resource comprises at least one of: (i) allocating the first computing resource for a predefined amount of time and (ii) allocating at least one unit of the first computing resource.

7. The method of claim 1, wherein the QoS level is differentiated for each of the plurality of levels of priority.

8. A system, comprising:
a computer processor; and
a memory containing a program which when executed by the processor performs an operation to allocate compute resources in a fog computing platform, the operation comprising:
receiving, by a fog computing platform, a request from a wireless device to perform a compute task on behalf of the wireless device;
determining a first computing resource, of a plurality of computing resources, required to perform the compute task;
determining a sentiment of a text of a first item of content, of a plurality of items of content, published by a user associated with the wireless device on one of a plurality of social media platforms;
determining a level of participation of the user in a loyalty program, wherein the level of participation includes purchase history of the user;
determining a history of requests issued by a plurality of wireless devices associated with the user, wherein the requests comprise requests for the fog computing environment to perform compute tasks on behalf of one or more of the plurality of wireless devices associated with the user;
computing a score for the user based at least in part on the determined sentiment of the text, the determined level of participation in the loyalty program;
associating, based on the score and the history of requests, the request with a first level of priority, of a plurality of levels of priority, for accessing the first computing resource;
allocating, based at least in part on the first level of priority and a first resource requirement to complete the requested compute task, a first portion of the first computing resource to perform the requested compute task, wherein the first portion is insufficient to complete the requested compute task; and
subsequently to allocating the first portion:
associating, based on the score and the history of requests, the request with an updated level of priority of the plurality of levels of priority; and
a second resource requirement to complete a remainder of the requested compute task, a second portion of the first computing resource to perform the remainder of the requested compute task.

9. The system of claim 8, wherein the score is further computed based on:
a sentiment expressed by the user in a second item of content of the plurality of items of content published by the user on the plurality of social media platforms, wherein the second item of content comprises an image depicting the user; and
a length of time the user has been a member of the loyalty program.

10. The system of claim 9, wherein the computed score is associated with the first level of priority, wherein the computed score is relative to a first business that provides the allocated portion of the first computing resource, wherein the user is associated with a plurality of scores, wherein each of the plurality of scores is associated with a respective business that provides respective computing resources, wherein the user is further associated with a composite score, wherein the composite score is based on each of the plurality of scores.

11. The system of claim 8, the operation further comprising prior to allocating the portion of the first computing resource:
determining a set of attributes of the wireless device;
identifying a set of computing resources required to perform the compute task, wherein the set of computing resources is of the plurality of computing resources and includes the first computing resource;
determining an amount of time required to perform the compute task using the set of compute resources;
determining a cost of performing the compute task using the set of compute resources;
determining a level of use of all compute resources in the fog computing environment;
determining a set of currently pending compute tasks to be performed by the fog computing environment, and
allocating the set of computing resources to the wireless device based on the set of attributes of the wireless device, the set amount of time required to perform of the compute task, the cost of performing the compute task, the level of use of the compute resources in the fog computing environment, and the set of currently pending compute tasks.

12. The system of claim 8, wherein the wireless device comprises an Internet-of-Things (IOT) device, wherein the plurality of computing resources comprise: (i) a processor, (ii) a storage device, (iii) a memory, (iv) a graphics processor, (v) a field programmable gate array (FPGA), (vi) a coherent accelerator, and (vii) an encryption device.

13. The system of claim 8, wherein allocating the first portion of the first computing resource comprises at least one of: (i) allocating the first computing resource for a predefined amount of time, and (ii) allocating at least one unit of the first computing resource.

14. The system of claim 8, wherein the QoS level is differentiated for each of the plurality of levels of priority.

15. A computer program product, comprising:
a non-transitory computer-readable storage medium having computer-readable program code embodied therewith, the computer-readable program code executable by one or more computer processors to perform an operation comprising:
receiving, by a fog computing platform, a request from a wireless device to perform a compute task on behalf of the wireless device;
determining a first computing resource, of a plurality of computing resources, required to perform the compute task;
determining a sentiment of a text of a first item of content, of a plurality of items of content, published by a user associated with the wireless device on one of a plurality of social media platforms;
determining a level of participation of the user in a loyalty program, wherein the level of participation includes purchase history of the user;
determining a history of requests issued by a plurality of wireless devices associated with the user, wherein the requests comprise requests for the fog computing environment to perform compute tasks on behalf of one or more of the plurality of wireless devices associated with the user;
computing a score for the user based at least in part on the determined sentiment of the text, the determined level of participation in the loyalty program;

associating, based on the score and the history of requests, the request with a first level of priority, of a plurality of levels of priority, for accessing the first computing resource;

allocating, based at least in part on the first level of priority and a first resource requirement to complete the requested compute task, a first portion of the first computing resource to perform the requested compute task, wherein the first portion is insufficient to complete the requested compute task;

associating, based on the score and the history of requests, the request with an updated level of priority of the plurality of levels of priority; and subsequently to allocating the first portion, allocating, based at least in part on the updated level of priority and a second resource requirement to complete a remainder of the requested compute task, a second portion of the first computing resource to perform the remainder of the requested compute task.

16. The computer program product of claim 15, wherein the score is further computed based on:

a sentiment expressed by the user in a second item of content of the plurality of items of content published by the user on the plurality of social media platforms, wherein the second item of content comprises an image depicting the user; and a length of time the user has been a member of the loyalty program.

17. The computer program product of claim 16, wherein the computed score is associated with the first level of priority, wherein the computed score is relative to a first business that provides the allocated portion of the first computing resource, wherein the user is associated with a plurality of scores, wherein each of the plurality of scores is associated with a respective business that provides respective computing resources, wherein the user is further associated with a composite score, wherein the composite score is based on each of the plurality of scores.

18. The computer program product of claim 15, the operation further comprising prior to allocating the portion of the first computing resource:

determining a set of attributes of the wireless device;

identifying a set of computing resources required to perform the compute task, wherein the set of computing resources is of the plurality of computing resources and includes the first computing resource;

determining an amount of time required to perform the compute task using the set of compute resources;

determining a cost of performing the compute task using the set of compute resources;

determining a level of use of all compute resources in the fog computing environment;

determining a set of currently pending compute tasks to be performed by the fog computing environment, and allocating the set of computing resources to the wireless device based on the set of attributes of the wireless device, the set amount of time required to perform of the compute task, the cost of performing the compute task, the level of use of the compute resources in the fog computing environment, and the set of currently pending compute tasks.

19. The computer program product of claim 15, wherein the wireless device comprises an Internet-of-Things (IOT) device, wherein the plurality of computing resources comprise: (i) a processor, (ii) a storage device, (iii) a memory, (iv) a graphics processor, (v) a field programmable gate array (FPGA), (vi) a coherent accelerator, and (vii) an encryption device.

20. The computer program product of claim 15, wherein allocating the portion of the first computing resource comprises at least one of: (i) allocating the first computing resource for a predefined amount of time and (ii) allocating at least one unit of the first computing resource.

* * * * *